United States Patent [15] 3,701,398
Martins [45] Oct. 31, 1972

[54] FLUID AND MECHANICALLY ACTUATED DISC BRAKE SYSTEM

[72] Inventor: Samuel J. Martins, Reseda, Calif.

[73] Assignee: Airheat Products, Inc., Van Nuys, Calif.

[22] Filed: Oct. 15, 1970

[21] Appl. No.: 80,979

[52] U.S. Cl. .............. 188/71.8, 188/72.6, 188/72.9, 188/106 F, 188/170, 188/196 P
[51] Int. Cl. ............................................. F16d 65/52
[58] Field of Search .......... 188/71.7, 71.8, 72.1, 72.4, 188/72.6, 72.9, 72.7, 106 F, 170, 196 P

[56] References Cited

UNITED STATES PATENTS

| 3,337,008 | 8/1967 | Trachte | 188/106 F |
| 3,371,753 | 3/1968 | Meier | 188/196 P X |
| 3,599,761 | 8/1971 | Schultz et al. | 188/170 |
| 3,500,969 | 3/1970 | Asher | 188/106 F |
| 3,155,200 | 11/1964 | Halibrand | 188/196 P |

Primary Examiner—George E. A. Halvosa
Attorney—White, Haefliger & Bachand

[57] ABSTRACT

The invention concerns improvements in a disc brake assembly that comprises:

a. first means operable in response to controlled application of fluid pressure transmitted from a source to advance a brake part into braking engagement with a rotating disc, the brake part being subject to wear, and b. second means operable in response to predetermined decrease in source fluid pressure to effect displacement of said brake part into braking engagement with said disc and irrespective of the worn condition of said part.

10 Claims, 8 Drawing Figures

INVENTOR.
SAMUEL J. MARTINS
By
White, Haefliger & Bachand
ATTORNEYS.

PATENTED OCT 31 1972 3,701,398

INVENTOR.
SAMUEL J. MARTINS
By
White, Haefliger & Bachand
ATTORNEYS.

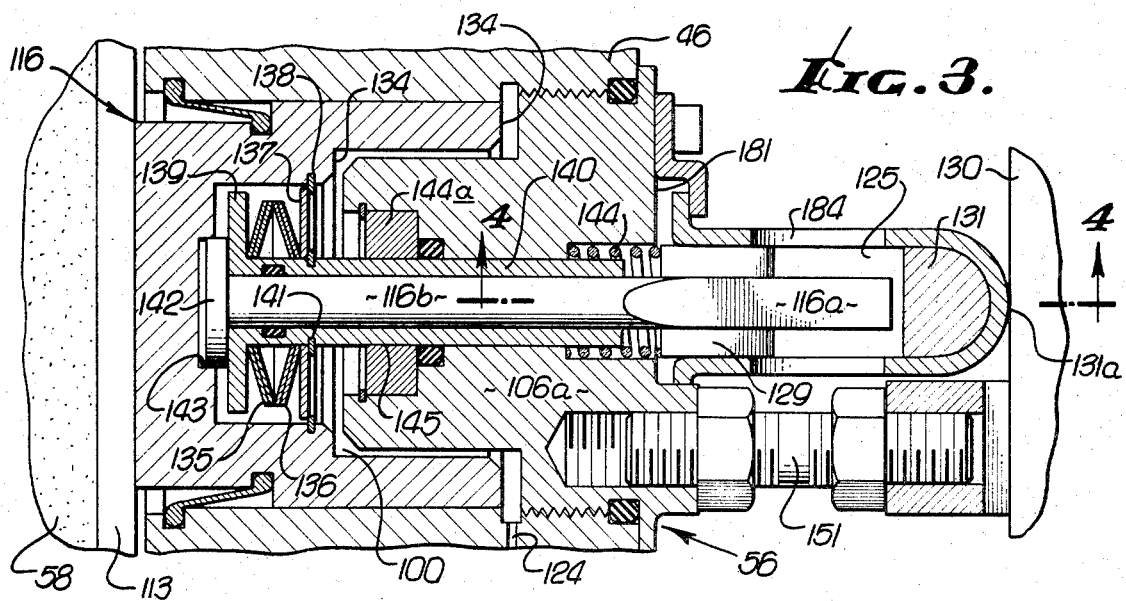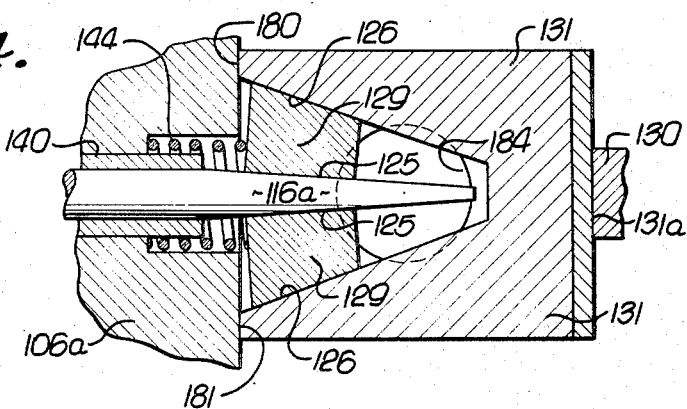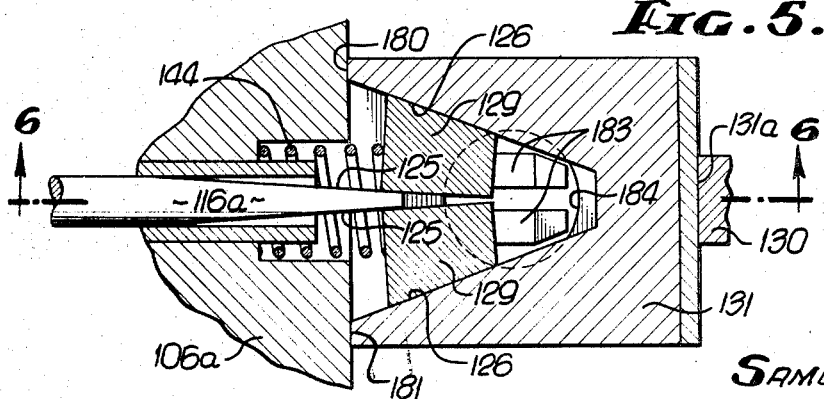

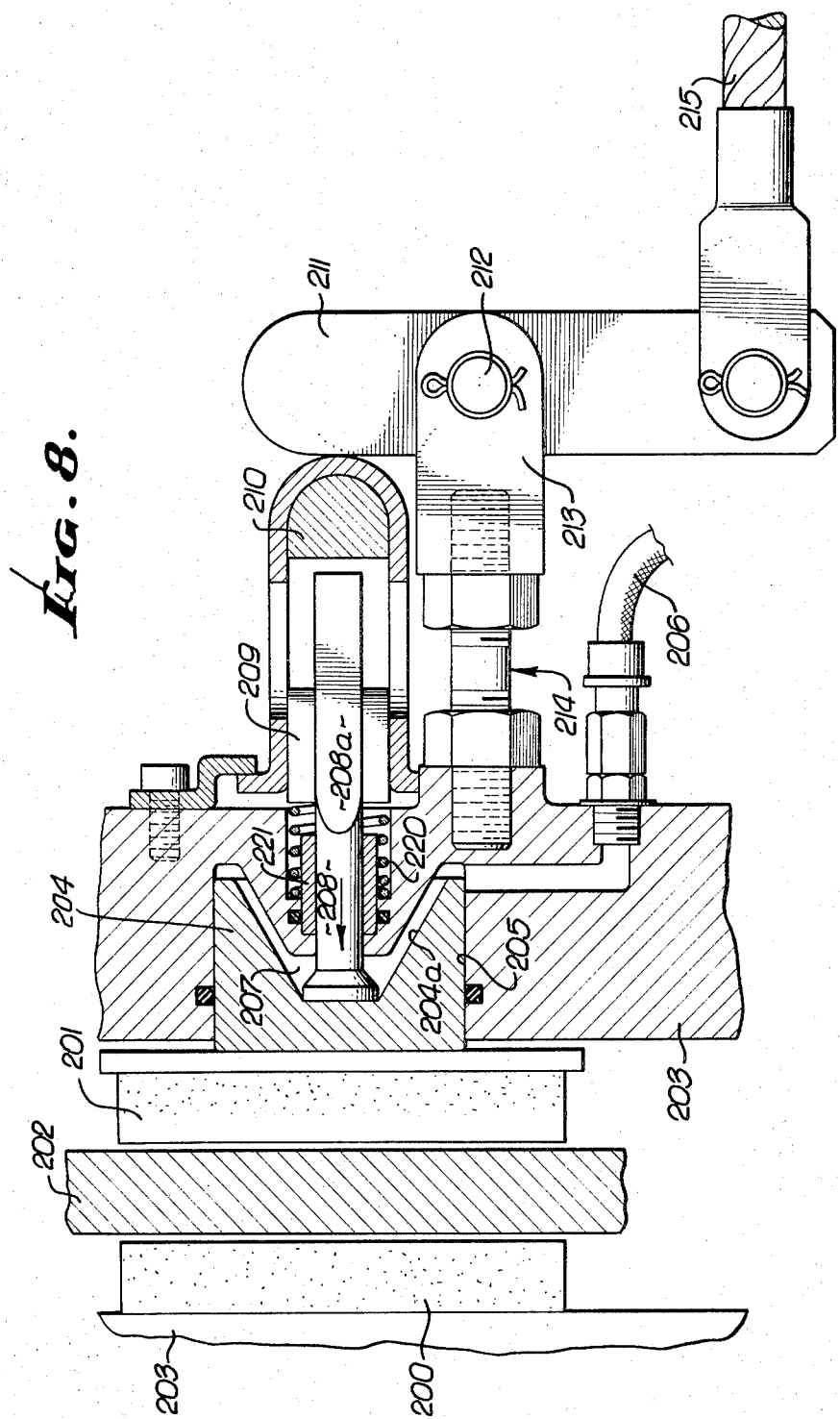

FLUID AND MECHANICALLY ACTUATED DISC BRAKE SYSTEM

BACKGROUND OF THE INVENTION

This invention relates generally to disc brakes, and more particularly concerns disc brake lining wear compensation.

It is desirable in certain disc brake installations to provide for both fluid pressure responsive brake application and auxiliary mechanical application of the brake. Such dual mode braking is of advantage, for example, in vehicles where provision for emergency mechanical braking is made in addition to the normal fluid pressure responsive brake application.

Where a fluid pressure responsive plunger is employed to urge the brake lining toward the disc, wear of such lining is not an impediment to fluid pressure operation of the brake, since more fluid is simply displaced into the cylinder to stroke the plunger; however, such wear presents a serious problem as respects auxiliary mechanically effected stroking of the plunger inasmuch as mechanical linkages have limited ranges of movement, and mechanical advantage may tend to lessen with increasing length of the piston stroke to effect braking.

A highly advantageous way of overcoming the latter problem involves the provision of load transmitting shoulders carried by the plunger and by auxiliary means to mechanically advance the plunger toward the disc or moving part to braked, such shoulders being located for relative shifting, in response to predetermined plunger advancement, to block retraction of the plunger in such manner as to compensate for brake lining wear, as disclosed in that certain Gilliland et al application Ser. No. 853,678 for U.S. Letters Patent entitled, "Disc Brake Wear Compensation", filed August 28, 1969, now U.S. Pat. No. 3,610,375. A further problem introduced by the use of such shoulders has to do with re-setting them when the worn brake lining is to be replaced, there being need for the provision of structure and mode of operation enabling quick and simple re-setting of the shoulders.

SUMMARY OF THE INVENTION

It is a major object of the invention to provide, in a disc brake assembly, apparatus characterized as overcoming the above problem, and also as adding unusually advantageous structure and braking functions.

Basically, the invention concerns the provision, in such a disc brake assembly, of first means operable in response to controlled application of fluid pressure transmitted from a source to advance a wearable brake part into braking engagement with a rotating disc, together with second means operable in response to predetermined decrease in source fluid pressure to effect displacement of the brake part into braking engagement with the disc, and irrespective of the worn condition of that part. Such first means may typically comprise a plunger and cylinder assembly, and the second means may comprise elements having wedging interengagement characterized as shiftable in response to an increase in the extent of such brake part advancement due to wear, to compensate for the latter. Also, the second means may advantageously include a lever, yieldable means operable to pivot the lever in response to the decrease in source fluid pressure, and structure operable in response to lever pivoting to urge one of the elements in a direction to advance the brake part toward the disc, as described.

Further, the referenced structure may with unusual advantage include a ram body receiving the elements a second of which has wedging interfit with the body and also with the first element which moves with the plunger; also, the second element may be wedge shaped and located to be easily reset relative to said one element as required during replacement of a worn brake part or pad carried by the plunger.

Additional objects and advantages of the invention include the carriage of the first and second means as described by a caliper adapted to straddle the disc during rotation of the latter, the caliper mounted to shift bodily in opposite directions relative to the disc in order to bring brake parts or pads in opposite sides of the disc into engagement with those sides in response to fluid pressure application; and the provision of pad retraction mechanism as will be described.

These and other objects and advantages of the invention, as well as the details of an illustrative embodiment, will be more fully understood from the following description and drawings, in which:

DRAWING DESCRIPTION

FIG. 3 is an enlarged section showing details of the brake actuator appearing in FIG. 2;

FIG. 4 is a section taken on line 4—4 of FIG. 3;

FIG. 5 is a view like FIG. 4, but showing a modified position of the mechanism.

FIG. 8 illustrates a modified form of the invention.

DETAILED DESCRIPTION

Figure 1:
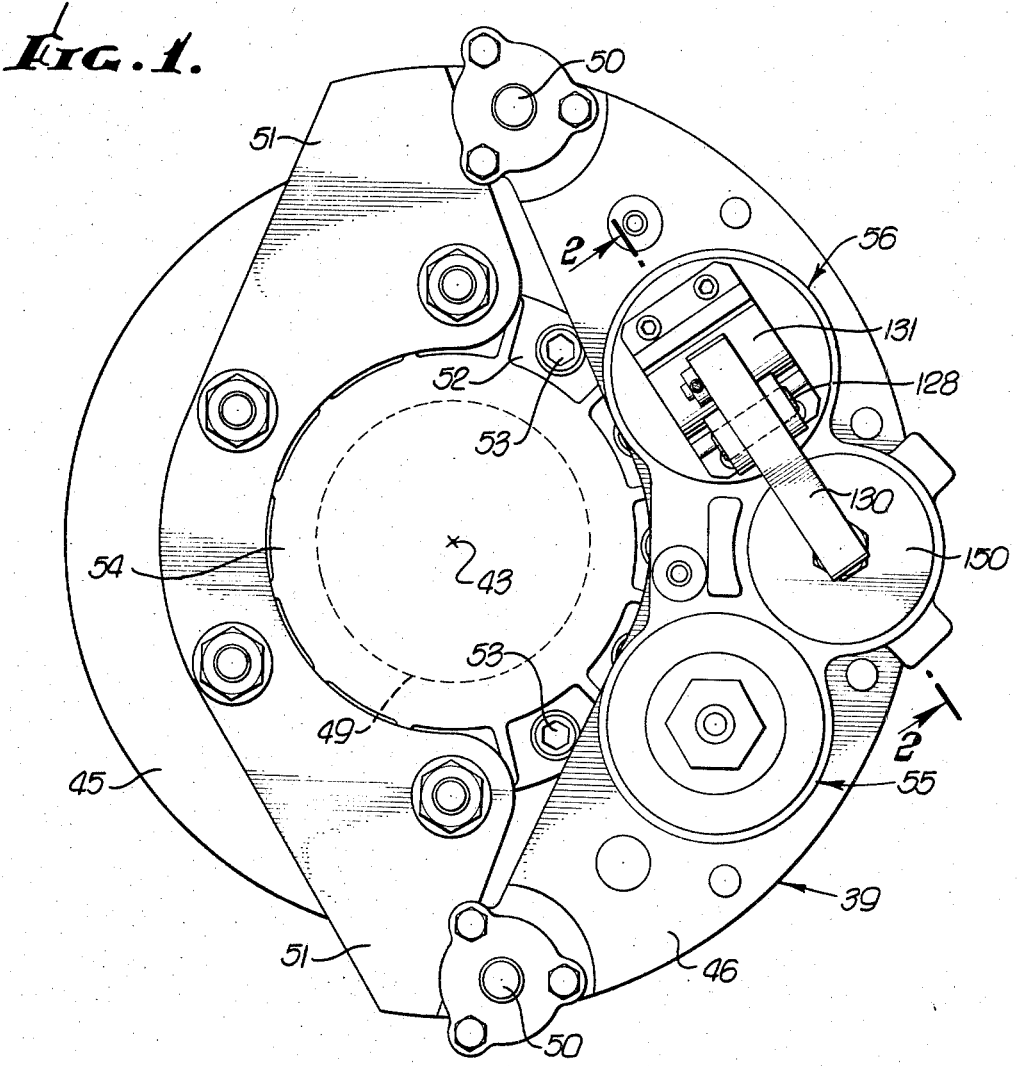
FIG. 1 is an end elevation showing a disc brake caliper structure.
Figure 7:
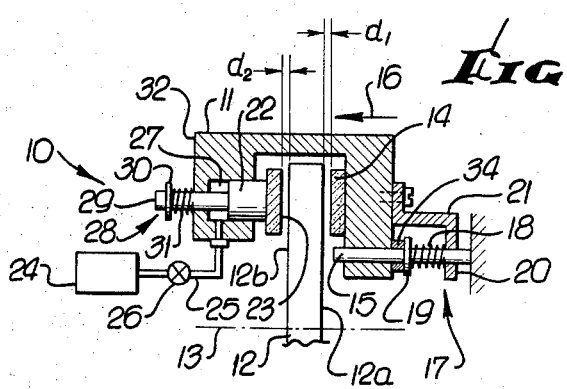
FIG. 7 is a diagrammatic showing of a retractable caliper assembly.
Figure 2:
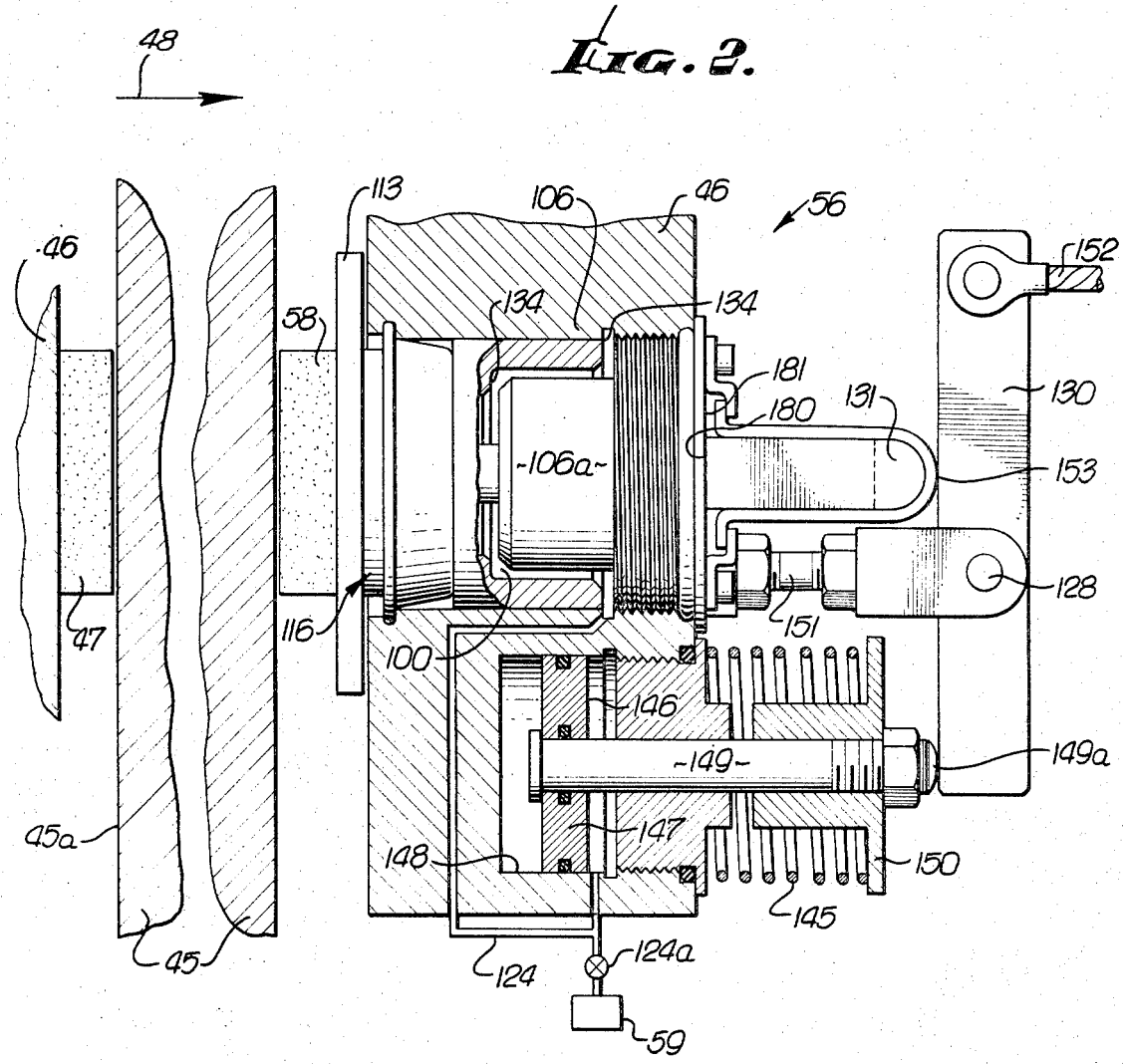
FIG. 2 is a section taken on line 2—2 of FIG. 1.

Referring first to FIG. 7 (showing an environment in which the invention is particularly useful) the illustrated disc brake assembly 10 includes a caliper 11 adapted to straddle the rotary disc 12 during disc rotation relative to the caliper and about axis 13; a braking element (as for example pad 14) carried by the caliper to face one side of the disc; means (as for example fixed shaft 15) mounting the caliper to shift in one direction (see arrow 16) in order to bring the braking element into braking engagement with one side face 12a of the disc in response to actuating force exertion on the caliper; and retractor means generally indicated at 17 carried to resist such shifting of the caliper and to displace the caliper in the opposite direction to carry the braking element out of engagement with the disc in response to reduction of actuating force exertion. In this regard, the retractor means 17 includes a compression spring 18 operatively connected between shaft 15 and the caliper to be compressed in response to caliper shifting in the direction of arrow 16. Note that spring 18 is held endwise between a part (as for example washer 19) on the shaft, and a shoulder 20 integral with the caliper, as for example via bracket 21.

Also shown in FIG. 7 is an actuator, as for example piston 22, carried by the caliper and another braking element, as for example pad 23, carried to be operable by the actuator to engage the opposite side 12b of the disc, whereby the actuator then exerts the previously mentioned actuating force on the caliper. For example, when fluid pressure from source 24 is transmitted via line 25 and valve 26 to the cylinder 27, the piston 22 is urged to the right to engage pad 23 with the disc 12. Reaction force transmitted by the fluid pressure on the caliper urges the latter to the left until pad 14 engages the disc 12, so that both pads then frictionally grip opposite sides of the disc with braking effect. Such shifting of the caliper results in compression of spring 18. Upon release of pressure application, the caliper 11 and pad 14 automatically retract a predetermined distance $d_1$ to the right in response to expansion of spring 18, whereby the pad 14 is held out of engagement with the disc until such time as the brake is again actuated. Also, the pad 23 is automatically retracted a predetermined distance $d_1$ plus $d_2$ to left, as by means of retractor mechanism 28, to compensate for the rightward movement $d_1$ of the caliper and to carry the pad 23 out of engagement with the disc until such time as the brake is again actuated. Retractor mechanism 28 may be similar to that shown at 17, and includes a shaft 29 integral with piston 22, a washer 30 on the shaft, and a compression spring 31 retained between the washer and the face 32 of the caliper. Accordingly, when fluid pressure exerted on piston 22 is relieved, the elements shift to positions such as seen in FIG. 5, with pads 23 and 14 held out of engagement with disc 12 despite incidental inertial loading as may occur upon turning of the vehicle, etc. Pat 34 blocks rightward caliper movement.

Referring now to FIGS. 1–6, the illustrated brake assembly 39 includes elements functioning in the manner as described in connection with FIG. 7, as well as additional unusually advantageous elements and modes of operation. Vehicle wheel structure (not shown) is mounted on a shaft which turns about axis 43, and attachment structure connects a braking disc 45 to the shaft.

The assembly 39 includes a caliper 46 straddling the disc 45, braking element or pad 47 carried by the caliper to face one side 45a of the disc; means mounting the caliper to shift in one direction (see arrow 48) in order to bring braking element 47 into braking engagement with disc side face 45a in response to actuating force exertion on the caliper; and retractor means carried to resist such shifting of the caliper and to displace the latter in the opposite direction to carry the pad 47 out of disc engagement in response to reduction of actuating force exertion. In this regard, the mounting means includes a pair of parallel shafts 50 (corresponding to shaft 15 in FIG. 7) extending outwardly of the disc periphery and at locations at opposite sides of axis 43 and non-rotary axle 49. Thus, the shafts may be spaced about the axis 43 at any included angle. The shafts are integral with oppositely extending torque arms 51 projecting from a hub 52 bolted at 53 to the axle flange 54. The torque arms are connected to the shafts 50.

By locating the fixed shafts 50 at opposite sides of the axis 43, the L-shaped caliper body 46 is enabled to be supported by the shafts 50 and torque arms 51 in a balanced condition. This further facilitates the use of two actuators generally indicated as housed at 55 and 56 in the caliper body 46. Such actuators may include pistons mounting brake pads and corresponding to piston 22 and brake pad 23 in FIG. 7.

Turning now to FIGS. 2–6, the invention broadly concerns the provision of first means, operable in response to applications of primary braking force, to advance a brake part (as for example pad 58 which is subject to wear) into braking engagement with a relatively rotating disc; a source of fluid pressure, as for example is indicated at 59; and, second means operable in response to predetermined decrease in such fluid pressure application to effect displacement of the brake part (or pad) into braking engagement with the disc, irrespective of various conditions of wear of that part 58. Such first means may typically comprise a plunger and cylinder assembly, the plunger responsive to fluid pressure application (as from source 59) to advance relative to the cylinder to transmit actuating force to advance the brake pad; in addition, the referred to second means may with unusual advantage include elements having wedging interengagement characterized as shiftable in response to an increase in the extent of such plunger advancement due to brake pad wear, to compensate for such wear.

In the example shown, the piston or plunger 116 is movable in the cylinder 106 to advance the plate 113 which carries the brake pad 58 subject to wear. A fluid pressure supply line for the cylinder is indicated at 124, with a master control valve at 124a. Such pressure is supplied to the space 100 behind the piston.

The referred to second means may advantageously include one element (as for example tapered terminal 116a on plunger extension or stem 116b) adapted to be urged to the left in FIG. 3 to displace the pad 58 into engagement with the rotating disc, as described. Such second means may also include another element or elements, such as wedge-shaped bodies 129, and a ram body 131 which is tubular to receive the elements 116a and 129. A lever 130 is pivoted at 128 to transmit force to the convex end portion 131a of the ram body to urge the elements 129 and 116b to the left, as described. In this regard, FIGS. 3–5 show the bodies 129 having tapered interfit with the recess walls 126 in the ram body, and with the tapered opposite sides 125 of the element 116a. The axial taper at walls 126 is greater than at sides 125 to facilitate resetting of the bodies 129, as will be described.

Application of fluid pressure via duct 124 to the plunger faces 134 tends to drive the plunger forwardly (leftwardly in FIGS. 2 and 3) against resistance imposed by a yieldable means such as the Belleville spring washers 135 and 136, whereby when the fluid pressure is relieved the plunger will be retracted rightwardly as the tapered spring washers expand. In this regard, annulus 137 is retained as shown between the washer 136 and a ring 138 coupled to the plunger, to transmit loading between the plunger and washers. Washer 135 bears against a flange 139 on a sleeve 140 to define a stop for the washers which is self-adjustable in accordance with brake lining wear as will appear. Another ring 141 coupled to the sleeve 140 stops rearward retraction of the plunger relative to the sleeve 140 by engaging the annulus 137 which moves with the plunger, as described.

The sleeve 140 extends coaxially about plunger stem 116b integral with the extension 116a, the stem being attached to the plunger 116 as by a flange 142 having press fit in bore 143. Further, the sleeve 140 is positioned axially by means of a drag ring 144a having frictional engagement at 145 with the sleeve. Accordingly, the sleeve cannot move axially and relative to the cylinder insert 106a unless it is forcibly displaced in response to predetermined force application. In this regard, as the lining wears and the plunger is sufficiently urged to the left in FIG. 3 by fluid pressure application, the resistance imposed by the drag ring 144a will be overcome by the force generated upon collapse of Belleville washers 135 and 136. Accordingly, the retraction structure of the brake is self-compensating with lining wear.

As the lining wears, and the plunger 116 and extension 116b are displaced to the left, the tapered terminal 116a is withdrawn to the left from between the wedge elements or bodies 129, as is seen in FIG. 5. At the same time, the compression spring 144 carried by the cylinder insert 106a urges the bodies 129 to the right relative to the ram body 131, and along tapers 126. This assures that the ram body remains mechanically connected to the plunger 116 to enable effective auxiliary braking should the fluid pressure in line 124 fail. In such circumstances, the lever 130 is pivoted counterclockwise in FIG. 2, in response to force exertion by a spring 145 to urge the ram body 131 to the left along with the plunger 116 now mechanically connected to the lever via the wedge bodies 129. Accordingly safety is enhanced in an emergency. Note that a stop shoulder 180 on the ram element is engagable with the shoulder 181 on insert 106a to limit leftward travel of the ram.

Normally, the fluid pressure supplied from source 59 is exerted against the face 146 of a piston 147 working in caliper body bore 148 to hold the spring 145 in compressed and retracted condition via a stem 149 and a cap 150 connected with the piston 147. The rightward terminal 149a of the stem engages the lever 130, as shown. Fulchrum point 128 of the lever is adjustable by means such as jack screw 151. A line 152 may be connected with the lever to relieve its force exertion at 153 against the ram 131, after such an emergency.

Figure 6:
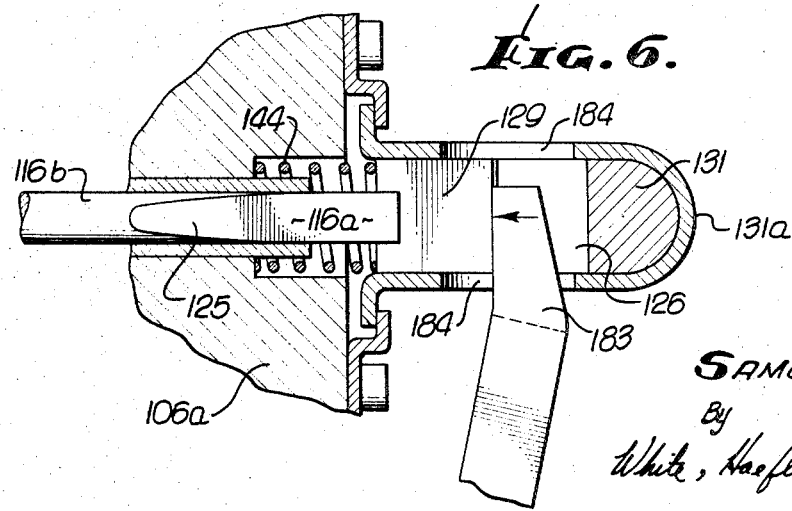
FIG. 6 is a view showing resetting of the brake structure.

At such times as the lining or pad 58 is replaced, the wedge parts 129 may be reset by means now to be described. FIGS. 5 and 6 show tongs 183 introduced through side openings 184 in the ram body 131 to pivot and engage the wedge bodies 129, urging them to the left so as to open the gap between them allowing rightward displacement of the stem portion 116a from FIG. 5 to FIG. 4 positions, for example. Accordingly, the mechanism may be quickly reset when a new brake lining or pad is inserted.

The unusual combination of advantages of the invention includes provision for fluid actuation of the brake coupled with mechanical automatic actuation in event of an emergency, automatic wear compensation and take-up as respects both fluid and mechanical elements, provision for re-setting of the mechanical take-up when the lining is replaced, manual release of the automatically actuated brake, and incorporation of the above in a floating caliper brake unit as used in a disc-brake environment.

In FIG. 8, brake pads 200 and 201 are shown at opposite sides of rotary disc 202. Caliper 203 straddles the disc to shift in accordance with the description in FIG. 7. Plunger 204 is movable in bore 205 to advance the pad 201 toward the disc, and in response to application to side 204a of the plunger of fluid pressure supplied via line 206 to space 207.

Plunger extension or stem 208 is secured to the plunger, and has a tapered terminal 208a structurally and functionally related to the wedge shaped bodies 209 and tubular ram body 210 in the same manner as corresponding elements 116a, 129 and 131 described in connection with FIGS. 2–6.

Lever 211 has pivotal connection at 212 with the fitting 213 adjustably secured at 214 to the caliper body, to permit adjustment of the fulchrum point of lever pivoting. The lever urges ram 210 to the left in response to rightward movement of a cable 215 connected to a brake handle or lever, so that mechanical actuation is well adapted to use during parking of a vehicle, or during an emergency.

Spring 220 urges bodies 209 toward the right, and sleeve 221 carried by caliper body centers the stem 208.

I claim:
1. In combination:
   a. a disc brake caliper body,
   b. a brake pad and a piston and cylinder assembly carried by said body and operable in response to fluid pressure application to the piston to urge the pad against the disc, and
   c. a ram body having an internal tapered surface and structure coupling said ram body to the piston to urge the latter toward the disc in response to auxiliary force transmission,
   d. said structure including a piston extension, having a tapered terminal and a wedge element having wedge coupling with both said tapered terminal and the ram body internal tapered surface to accommodate relative shifting of the piston and said extension toward the disc as the pad wears, while maintaining the ram body coupled to said piston extension for auxiliary force transmission, said ram body having a side opening to exteriorly expose said wedge element contained within the ram body for adjustment shifting out of wedge coupling relation with said piston extension to permit retraction thereof relatively away from the disc, the ram body projecting openly and free of confinement by the caliper body.

2. The combination of claim 1 including a piston stem carried to advance with said piston in response to said application of fluid pressure thereto, there being a support sleeve carried by the cylinder and a spring connected between the cylinder and sleeve to resist stem advancement in the sleeve and to retract the stem relative to the sleeve in response to decreased fluid pressure applicator to the piston, there also being a drag part carried by the cylinder to frictionally resist advancement and retraction of the sleeve, such resistance being overcome by piston induced sleeve displacement to compensate for brake part wear.

3. The combination of claim 1 including a spring urging the wedge element toward wedge coupling relation with the piston extension and ram body.

4. The combination of claim 1 wherein said brake pad is carried at one side of the disc, and including another brake pad carried by the caliper body at the opposite side of the disc.

5. The combination of claim 4 including means mounting the caliper body to shift in opposite directions relative to the disc in order to bring said brake pads into engagement with opposite sides of the disc in response to said fluid pressure application.

6. The combination of claim 5 including retractor means to retract said piston and to shift said caliper body in response to reduction of said primary braking force, and tending to disengage said braking pads from engagement with opposite sides of the disc.

7. The combination of claim 1 including auxiliary force transmitting means located to transmit force urging the ram body in a direction to urge the piston toward the disc.

8. The combination of claim 7 wherein said means includes a lever pivotally connected to said caliper body.

9. The combination of claim 8 wherein the lever has a fulchrum, and including means to adjustably position said fulchrum.

10. The combination of claim 8 including a spring operable to pivot the lever to exert braking force in response to a decrease in said fluid pressure, and another piston operatively connected to said lever and normally responsive to application of said fluid pressure to overcome the spring to prevent said pivoting of said lever.

* * * * *